US008774546B2

(12) United States Patent
Kang et al.

(10) Patent No.: US 8,774,546 B2
(45) Date of Patent: Jul. 8, 2014

(54) METHOD AND APPARATUS FOR SINGLE-IMAGE-BASED RAIN STREAK REMOVAL

(75) Inventors: Li-Wei Kang, Taipei (TW); Chia-Wen Lin, Hsinchu County (TW); Che-Tsung Lin, Hsinchu (TW); Yu-Chen Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 68 days.

(21) Appl. No.: 13/551,617

(22) Filed: Jul. 18, 2012

(65) Prior Publication Data
US 2013/0236116 A1 Sep. 12, 2013

(30) Foreign Application Priority Data

Mar. 8, 2012 (TW) .............................. 101107886 A

(51) Int. Cl.
*G06K 9/40* (2006.01)
(52) U.S. Cl.
USPC ............................ 382/260; 382/263; 382/275
(58) Field of Classification Search
CPC ............ G06T 5/001; G06T 5/20; G06T 5/50; G06T 5/004; G06T 5/40; G06K 9/40; H04N 5/21; H04N 1/409; H04N 1/4092; H04N 7/26888; H04N 1/4097
USPC ......... 382/260, 263, 264, 254, 275, 233, 240, 382/131, 132; 375/240.25; 348/620; 378/38; 341/79; 702/189; 361/115
See application file for complete search history.

(56) References Cited

U.S. PATENT DOCUMENTS

| 7,436,884 | B2 * | 10/2008 | Chen et al. ................ 375/240 |
| 7,577,299 | B2 | 8/2009 | Kawamata et al. |
| 7,720,580 | B2 | 5/2010 | Higgins-Luthman |

FOREIGN PATENT DOCUMENTS

| CN | 2512665 | 9/2002 |
| KR | 20100053719 | 5/2010 |
| TW | 466192 | 12/2001 |
| TW | M413626 | 10/2011 |
| WO | 2006/024247 | 3/2006 |

OTHER PUBLICATIONS

Mairal et al., "Online Learning for Matrix Factorization and Sparse Coding," Journal of Machine Learning Research 11, 2010, pp. 19-60.
Mallat et al., "Matching Pursuits With Time-Frequency Dictionaries," IEEE Transactions on Signal Processing 41 (12), Dec. 1993, pp. 3397-3415.
Garg et al., "When Does a Camera See Rain?," IEEE International Conference on Computer Vision (ICCV), vol. 2, Oct. 2005, pp. 1067-1074.
Park et al., "Development of Vision based Control Smart Windshield Wiper System for Intelligent Vehicle," SICE-ICASE International Joint Conference 2006, Oct. 18-21, 2006, pp. 4398-4403.

(Continued)

*Primary Examiner* — Anh Do
(74) *Attorney, Agent, or Firm* — Jianq Chyun IP Office

(57) ABSTRACT

A method and an apparatus for single-image-based rain streak removal are introduced herein. In this method and apparatus, an original image is decomposed into a high frequency part and a low frequency part, and the high frequency image is then decomposed into a rain part and a non-rain part. The non-rain high frequency image and the original low frequency image are used to produce a non-rain image.

18 Claims, 2 Drawing Sheets

(56) References Cited

OTHER PUBLICATIONS

Sun et al., "A Removal Algorithm of Rain and Snow from Images Based on Fuzzy Connectedness," 2010 International Conference on Computer Application and System Modeling (ICCASM), 2010, pp. V5-478-V5-481.

Garg et al., "Detection and Removal of Rain from Videos," Proc. of the 2004 IEEE Computer Society Conference on Computer Vision and Pattern Recognition, vol. 1, 2004, pp. 1-528-1-535.

Zhang et al., "Rain Removal in Video by Combining Temporal and Chromatic Properties," 2006 IEEE International Conference on Multimedia and Expo, 2006, pp. 461-464.

\* cited by examiner

METHOD AND APPARATUS FOR SINGLE-IMAGE-BASED RAIN STREAK REMOVAL

CROSS-REFERENCE TO RELATED APPLICATION

This application claims the priority benefit of Taiwan application serial no. 101107886, filed on Mar. 8, 2012. The entirety of the above-mentioned patent application is hereby incorporated by reference herein and made a part of this specification.

BACKGROUND

1. Technical Field

The disclosure relates to a single-image-based rain streak removal method and apparatus.

2. Related Art

Nowadays, with growing affluence in our lives, vehicles are becoming more and more popular. In addition to the continuous progress on power, the improvement on safety during driving is another subject that needs to be focused in developing the vehicle technology. Many vision-based safety warning systems warn a driver to keep a safe distance by recognizing obstacles in the captured image. However, such systems often fail to work properly in bad weather such as heavy rain, because it blurs the texture of the appearance of lanes, traffic signs or obstacles such as pedestrians or vehicles in the captured image, and, as a result, a lot of bad recognition results may occur. It is very dangerous for the driver to drive under such driving environments.

There are currently a variety of methods that can determine whether it is raining based on an image of the windshield or an image outside the car. However, these methods are used only as a basis for determining whether to automatically activate rain wipers and do not perform any processing to the image itself. Many relevant studies have shown that these methods can be only used in images having a static background because these methods must rely on a streak's relative movement between a previous image and a later image in a video to infer whether it is raining.

SUMMARY

A single-image-based rain streak removal method is introduced herein. In this method, an original image is decomposed into an original high frequency image and an original low frequency image. A dictionary is obtained, which is the best for representing a plurality of patches of a reference image and includes a rain sub-dictionary and a non-rain sub-dictionary. A coefficient of each patch of a plurality of patches of the original high frequency image corresponding to the dictionary is found according to a first cost function and a prerequisite. A non-rain high frequency image is produced using the dictionary and the coefficient of each patch of the original high frequency image. The original low frequency image and the non-rain high frequency image are combined into a non-rain image.

A single-image-based rain streak removal apparatus is also introduced herein. The rain streak removal apparatus includes a processor. The processor receives an original image, decomposes an original image into an original high frequency image and an original low frequency image, and obtains the dictionary. The processor finds a coefficient of each patch of a plurality of patches of the original high frequency image corresponding to the dictionary according to a first cost function and a prerequisite, produces a non-rain high frequency image using the dictionary and the coefficient of each patch of the original high frequency image, and combines the original low frequency image and the non-rain high frequency image into a non-rain image.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
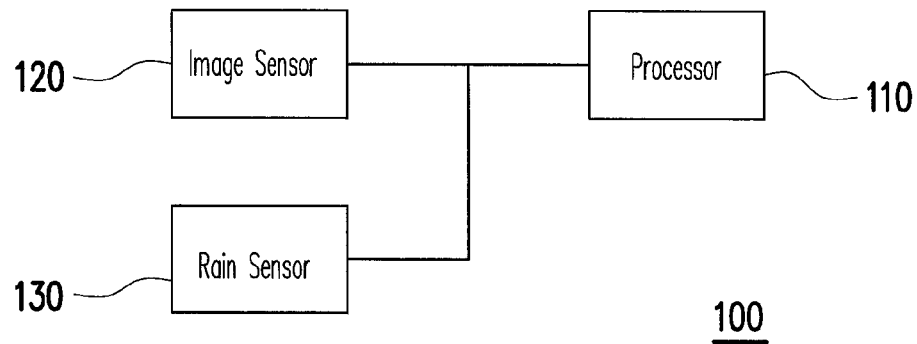
FIG. 1 is a schematic diagram illustrating a single-image-based rain streak removal apparatus according to one exemplary embodiment.

FIG. 1 is a schematic diagram illustrating a single-image-based rain streak removal apparatus 100 according to one exemplary embodiment. A rain streak refers to a streak in an image that is caused by falling or flying rain, and the rain streak removal apparatus 100 can remove the rain streak from an image. The rain streak removal apparatus 100 includes a processor 110, an image sensor 120, and a rain sensor 130, all three of which are hardware components. The processor 110 is coupled to the image sensor 120 and the rain sensor 130.

The image sensor 120 is used to capture an image that may contain a rain streak. The image sensor 120 may be an infrared camcorder or an image capturing device such as charge-coupled device (CCD) camera or complementary metal-oxide semiconductor (CMOS) camera. The rain sensor 130 is used to sense whether it is raining. The rain sensor 130 may be a reflective sensor, an audio sensor or a conductive sensor. Both the image sensor and the rain sensor are known in the art and, therefore, explanation thereof is not repeated herein. In another embodiment, the rain streak removal apparatus 100 includes a processor 110 for receiving an original image.

Figure 2:
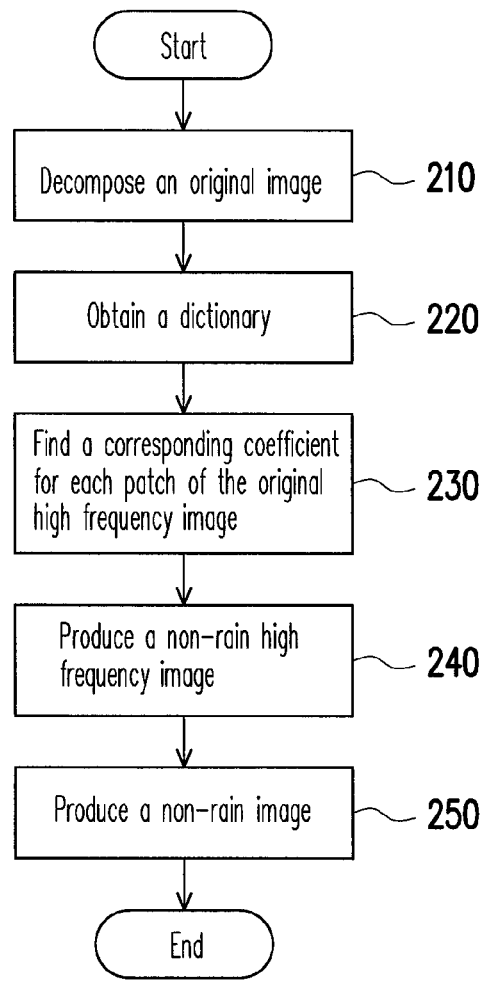
FIG. 2 and FIG. 3 are schematic diagrams illustrating flow charts of a single-image-based rain streak removal method according to one exemplary embodiment.
Figure 3:
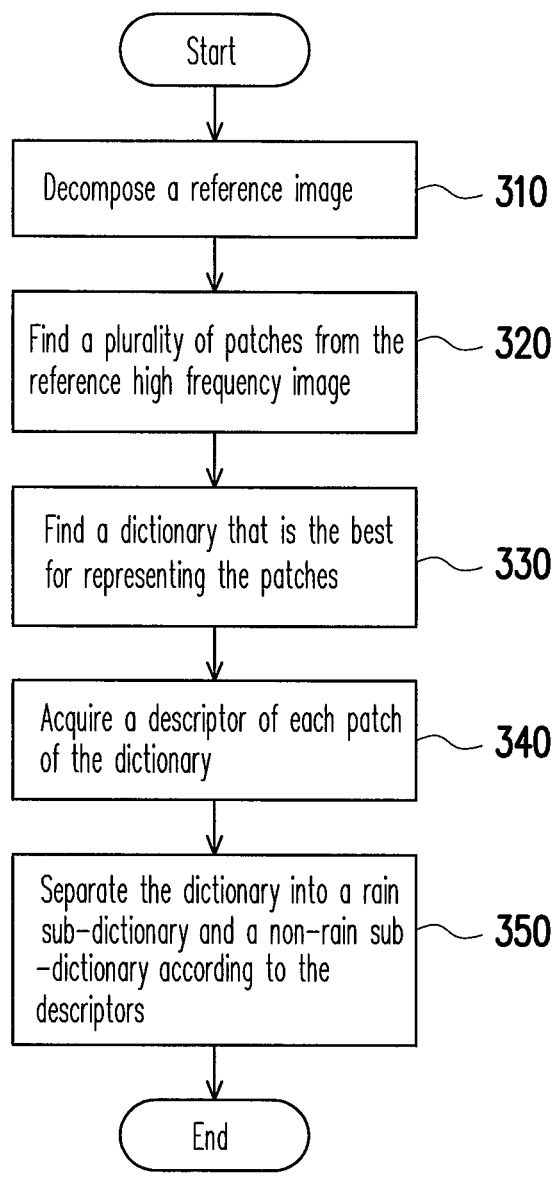

FIG. 2 and FIG. 3 are schematic diagrams illustrating flow charts of a single-image-based rain streak removal method according to one exemplary embodiment. The processor 110 can carry out the rain streak removal method of FIG. 2 and FIG. 3. In other words, each step shown in FIG. 2 and FIG. 3 is performed by the processor 110.

The processor 110 can determine whether to perform the rain streak removal method on an image captured by the image sensor 120 according to a sensing result of the rain sensor 130. If it is currently raining, then the processor 110 performs the rain streak removal method on the image captured by the image sensor 120 to produce a clear non-rain image. If it is currently not raining, then the processor 110 would not perform any processing on the image captured by the image sensor 120. Alternatively, a user may also directly determine whether to control the processor 110 to perform the rain streak removal method on the image captured by the image sensor 120. In this case, the rain sensor 130 may be omitted.

The rain streak removal method of FIG. 2 and FIG. 3 analyzes and processes images with each image as a unit. If a continuous video is to be analyzed and processed, images of the video must undergo the rain streak removal method of FIG. 2 and FIG. 3 one by one to remove the rain streaks in the entire video. The following description is made with reference to a single image as an example, in which the single image is referred to as an original image I. In the case of a continuous video, each image of the video can be processed in a similar manner.

At step 210, a bilateral filter or another filter that is capable of decomposing the original image I into a high frequency part and a low frequency part is first utilized to decompose the original image I into an original high frequency image $I_{HF}$ and an original low frequency image $I_{LF}$, where $I=I_{LF}+I_{HF}$.

At step 220, a dictionary $D_{HF}$ is then obtained from a reference image $I_{REF}$. The dictionary $D_{HF}$ is a basis, which is the best for representing a plurality of patches $y^k$ of the reference image $I_{REF}$, k=1, 2, ..., P, where P is a preset positive integer. The dictionary $D_{HF}$ includes two parts, i.e. a rain sub-dictionary $D_{HF\_R}$ and a non-rain sub-dictionary $D_{HF\_G}$.

In this exemplary embodiment, the original image I and the reference image $I_{REF}$ belong to one same continuous video. The reference image $I_{REF}$ may be an image prior to the original image I in terms of time sequence. Alternatively, the reference image $I_{REF}$ may also be the original image I itself. If the reference image $I_{REF}$ is the original image I itself, then the dictionary $D_{HF}$ is obtained from the original image I itself at step 220. If the reference image $I_{REF}$ is prior to the original image I, the dictionary $D_{HF}$ of the reference image $I_{REF}$ is directly used at step 220, without calculating the dictionary $D_{HF}$ for the original image I. If the reference image $I_{REF}$ is not the original image I, the two images are better to possess the same static background. Only the same static background can make the dictionary $D_{HF}$ of the reference image $I_{REF}$ suitable for representing the original image I and achieve a good rain removal effect.

FIG. 3 is a schematic diagram illustrating a flow chart of obtaining the dictionary $D_{HF}$ from the reference image $I_{REF}$. As described above, the reference image $I_{REF}$ may be an image prior to the original image in terms of time sequence or the original image I itself. At step 310, the reference image $I_{REF}$ is first decomposed into a reference high frequency image $I_{REF\_HF}$ and a reference low frequency image $I_{REF\_LF}$. If the reference image $I_{REF}$ is the original image I, step 310 may be omitted because step 210 has already been performed. At step 320, a series of patches $y^k$, k=1, 2, ..., P, is found from the reference high frequency image $I_{REF\_HF}$. There are currently many methods of finding patches from an image, for example, using a sliding window having a preset size to move across the reference high frequency image $I_{REF\_HF}$ in a preset manner. Each time the sliding window is moved one pixel, the portion of the reference high frequency image $I_{REF\_HF}$ that is covered by the sliding window is taken as one of the patches $y^k$, and this action is repeated for P times.

At step 330, a dictionary $D_{HF}$ that is the best for representing the patches $y^k$ of the reference high frequency image $I_{REF\_HF}$ is then found according to the following second cost function (1):

$$\min_{D_{HF} \in R^{n \times m}, \theta^k \in R^m} \frac{1}{P} \sum_{k=1}^{P} \left( \frac{1}{2} \| y^k - D_{HF} \theta^k \|_2^2 + \lambda \| \theta^k \|_1 \right) \quad (1)$$

Where, R represents a set of real numbers, m and n are preset positive integers, $\theta^k$ is a coefficient that makes the dictionary $D_{HF}$ approximate each patch $y^k$, $\lambda$ is a preset parameter, $\| \ \|_1$ represents a first norm, and $\| \ \|_2$ represents a second norm.

There are currently a variety of methods of finding the dictionary $D_{HF}$ that is the best for representing $y^k$, i.e. a dictionary $D_{HF}$ that makes the second cost function (1) have a minimum value. For example, such a dictionary $D_{HF}$ can be found through online dictionary learning. The dictionary $D_{HF}$ consists of m of p $y^k$. The following article may be referred for details of the online dictionary learning.

J. Mairal, F. Bach, J. Ponce, and G. Sapiro, "Online learning for matrix factorization and sparse coding," J. Mach. Learn. Res., vol. 11, pp. 19-60, 2010.

At step 340, a descriptor of a histogram of oriented gradient (HOG) of each patch of the dictionary $D_{HF}$ is then acquired. At step 350, the patches in the dictionary $D_{HF}$ are separated into two sub-dictionaries, i.e. a rain sub-dictionary $D_{HF\_R}$ and a non-rain sub-dictionary $D_{HF\_G}$, according to a variance of gradient direction of the descriptor of each patch of the dictionary $D_{HF}$. For example, the patches in the dictionary $D_{HF}$ can be separated into a rain sub-dictionary $D_{HF\_R}$ and a non-rain sub-dictionary $D_{HF\_G}$ using a K-means algorithm and the variance of each patch of the dictionary $D_{HF}$.

The principle of step 340 and step 350 is that some patches of the dictionary $D_{HF}$ contain rain streaks and some others don't. The rain has a consistent movement direction within a small scope. Therefore, the rain streaks in those rain patches usually have the same direction, i.e. the variance of gradient direction should be small. The descriptor of each patch of the dictionary $D_{HF}$ is a one-dimensional histogram in a local gradient direction that is generated according to a local image brightness gradient or an edge orientation distribution of the patch and is used to describe each patch of the dictionary $D_{HF}$. The HOG is a well-known algorithm and a detailed explanation thereof is therefore not repeated herein.

After the dictionary $D_{HF}$ is obtained, the method proceeds to step 230 of FIG. 2 to find a coefficient $\theta_{HF}^k$ of each patch $b_{HF}^k$ of the plurality of patches $b_{HF}^k \in R^n$, k=1, 2, ..., P of the original high frequency image $I_{HF}$ corresponding to the dictionary $D_{HF}$, according to the following first cost function (2) and a prerequisite (3).

$$\min_{\theta_{HF}^k \in R^m} \| b_{HF}^k - D_{HF} \theta_{HF}^k \|_2^2 \quad (2)$$

$$\| \theta_{HF}^k \|_0 \leq L \quad (3)$$

Where, $\| \ \|_0$ represents a zero norm, and L is a preset parameter. In this exemplary embodiment, L is 10.

The purpose of step 230 is to find the coefficient $\theta_{HF}^k$ that makes the first cost function (2) have a minimum value under the prerequisite (3) for each patch $b_{HF}^k$ of the original high frequency image $I_{HF}$. The patch $b_{HF}^k$ is not the same as the previously mentioned $y^k$. At this time, each patch $b_{HF}^k$ is unknown. The coefficient $\theta_{HF}^k$ is to be used to reconstruct the patch $b_{HF}^k$ later at step 240. The reason of making the first cost function (2) have a minimum value is to minimize the error of the reconstructed patch $b_{HF}^k$.

There are currently a variety of methods that can find the optimal coefficient $\theta_{HF}^k$ according to the first cost function (2) and the prerequisite (3). For example, an, orthogonal matching pursuit (OMP) algorithm can be used to find the optimal coefficient $\theta_{HF}^k$. The following article may be referred for details of the OMP algorithm.

S. Mallat and Z. Zhang, "Matching pursuits with time-frequency dictionaries," IEEE Trans. Signal Process., vol. 41, no. 12, pp. 3397-3415, December 1993.

At step 240, a non-rain high frequency image $I_{HF}^{G}$ is then produced using the dictionary $D_{HF}$ and the coefficient $\theta_{HF}^{k}$ of each patch $b_{HF}^{k}$ of the original image $I_{HF}$, which is detailed as follows. Because the coefficient $\theta_{HF}^{k}$ can make the first cost function (2) have a minimum value, the product $D_{HF}\theta_{HF}^{k}$ of the dictionary $D_{HF}$ and the coefficient $\theta_{HF}^{k}$ of each patch $b_{HF}^{k}$ can be approximately taken as the patch $b_{HF}^{k}$, Because the dictionary $D_{HF}$ and the coefficient $\theta_{HF}^{k}$ are both known, and the dictionary $D_{HF}$ has been separated into the rain sub-dictionary and the non-rain sub-dictionary (i.e. $D_{HF}=[D_{HF\_G}|D_{HF\_R}]$), when the dictionary $D_{HF}$ is multiplied by the coefficient $\theta_{HF}^{k}$, a portion resulted from multiplying the non-rain sub-dictionary $D_{HF\_G}$ by the coefficient $\theta_{HF}^{k}$ can produce a non-rain portion of a patch $b_{HF}^{k}$, Therefore, the non-rain portions of the patches $b_{HF}^{k}$ can be combined into the non-rain high frequency image $I_{HF}^{G}$.

At step 250, the original low frequency image $I_{LF}$ and the non-rain high frequency image $I_{HF}^{G}$ are then combined into a non-rain image $I^{Non\_Rain}$, i.e. $I^{Non\_Rain}=I_{LF}+I_{HF}^{G}$. The non-rain image $I^{Non\_Rain}$, in which the rain streak has been removed, can serve as an output of the above single-image-based rain streak removal apparatus and method.

In summary, the present disclosure can remove the rain streak from the image to obtain a clearer image. The image with rain removed can be utilized in event recording system, driving safety system, surveillance system, or the like, which can facilitate increasing the recognition rate of the objects and people in the image and hence ensure the system's robustness.

The single-image-based rain streak removal apparatus and method proposed by this disclosure can rely on a single image to achieve the rain removal purpose, without comparing multiple images in a continuous video. Therefore, the presently proposed rain streak removal apparatus and method apply regardless whether the background is static or dynamic.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A single-image-based rain streak removal method executed by a processor of a single-image-based rain streak removal apparatus, comprising:
    the processor decomposing an original image into an original high frequency image and an original low frequency image;
    the processor obtaining a dictionary, wherein the dictionary is the best for representing a plurality of patches of a reference image and the dictionary comprises a rain sub-dictionary and a non-rain sub-dictionary;
    the processor finding a coefficient of each patch of a plurality of patches of the original high frequency image corresponding to the dictionary according to a first cost function and a prerequisite;
    the processor producing a non-rain high frequency image using the dictionary and the coefficient of each of the patches of the original high frequency image; and
    the processor combining the original low frequency image and the non-rain high frequency image into a non-rain image.

2. The single-image-based rain streak removal method according to claim 1, further comprising:
    using a bilateral filter to decompose the original image into the original high frequency image and the original low frequency image.

3. The single-image-based rain streak removal method according to claim 1, wherein the original image and the reference image belong to one same continuous video, and the reference image is prior to the original image in terms of time sequence or the reference image is the original image.

4. The single-image-based rain streak removal method according to claim 1, wherein the step of obtaining the dictionary comprises:
    decomposing the reference image into a reference high frequency image and a reference low frequency image;
    finding a plurality of patches from the reference high frequency image;
    finding the dictionary that is the best for representing the plurality of patches of the reference high frequency image according to a second cost function;
    acquiring a descriptor of a histogram of oriented gradient of each patch of the dictionary; and
    separating the patches in the dictionary into the rain sub-dictionary and the non-rain sub-dictionary according to a variance of gradient direction of the descriptor of each of the patches of the dictionary.

5. The single-image-based rain streak removal method according to claim 4, further comprising:
    finding the dictionary that makes the second cost function have a minimum value through online dictionary learning.

6. The single-image-based rain streak removal method according to claim 4, further comprising:
    separating the patches in the dictionary into the rain sub-dictionary and the non-rain sub-dictionary using a K-means algorithm and the variance of each of the patches of the dictionary.

7. The single-image-based rain streak removal method according to claim 1, wherein the step of finding the coefficient of each patch of the original high frequency image comprises:
    for each of the patches of the original high frequency image, finding the coefficient that makes the first cost function have a minimum value under the prerequisite using an orthogonal matching pursuit algorithm.

8. The single-image-based rain streak removal method according to claim 1, wherein the step of producing the non-rain high frequency image comprises:
    taking a product of the dictionary and the coefficient of each of the patches of the original high frequency image approximately as the patch of the original high frequency image; and
    combining non-rain portions of the plurality of patches of the original high frequency image into the non-rain high frequency image, wherein the non-rain portions are resulted from the non-rain sub-dictionary.

9. A single-image-based rain streak removal apparatus, comprising:
    a processor, receiving an original image, decomposing the original image into an original high frequency image and an original low frequency image, and obtaining a dictionary, wherein the dictionary is the best for representing a plurality of patches of a reference image and the dictionary comprises a rain sub-dictionary and a non-rain sub-dictionary, the processor finds a coefficient of each of the patches of the original high frequency image corresponding to the dictionary according to a first cost function and a prerequisite, produces a non-rain high frequency image using the dictionary and the coefficient of each of the patches of the original high frequency image, and combines the original low frequency image and the non-rain high frequency image into a non-rain image.

10. The single-image-based rain streak removal apparatus according to claim 9, wherein the processor utilizes a bilateral filter to decompose the original image into the original high frequency image and the original low frequency image.

11. The single-image-based rain streak removal apparatus according to claim 9, wherein the original image and the reference image belong to one same continuous video, and the reference image is prior to the original image in terms of time sequence or the reference image is the original image.

12. The single-image-based rain streak removal apparatus according to claim 9, wherein the processor decomposes the reference image into a reference high frequency image and a reference low frequency image, finds a plurality of patches from the reference high frequency image, finds the dictionary that is the best for representing the plurality of patches of the reference high frequency image according to a second cost function, acquires a descriptor of a histogram of oriented gradient of each patch of the dictionary, and separates the patches in the dictionary into the rain sub-dictionary and the non-rain sub-dictionary according to a variance of gradient direction of the descriptor of each of the patches of the dictionary.

13. The single-image-based rain streak removal apparatus according to claim 12, wherein the processor finds the dictionary that makes the second cost function have a minimum value through online dictionary learning.

14. The single-image-based rain streak removal apparatus according to claim 12, wherein the processor separates the patches in the dictionary into the rain sub-dictionary and the non-rain sub-dictionary using a K-means algorithm and the variance of each of the patches of the dictionary.

15. The single-image-based rain streak removal apparatus according to claim 9, wherein, for each of the patches of the original high frequency image, the processor finds the coefficient that makes the first cost function have a minimum value under the prerequisite using an orthogonal matching pursuit algorithm.

16. The single-image-based rain streak removal apparatus according to claim 9, wherein the processor takes a product of the dictionary and the coefficient of each of the patches of the original high frequency image approximately as the patch of the original high frequency image, and combines non-rain portions of the plurality of patches of the original high frequency image into the non-rain high frequency image, wherein the non-rain portions are resulted from the non-rain sub-dictionary.

17. The single-image-based rain streak removal apparatus according to claim 9, further comprising an image sensor capturing the original image, wherein the processor is coupled to the image sensor.

18. The single-image-based rain streak removal apparatus according to claim 9, further comprising a rain sensor, wherein the processor is coupled to the rain sensor and determines whether to perform rain streak removal on the original image according to a sensing result of the rain sensor.

* * * * *